United States Patent
Aschenbruck et al.

(10) Patent No.: US 9,182,039 B2
(45) Date of Patent: Nov. 10, 2015

(54) SEALING SEGMENT AND SEALING-SEGMENT ARRANGEMENT

(75) Inventors: Emil Aschenbruck, Duisburg (DE); Michael Blaswich, Oberhausen (DE); Jaman El Masalme, Hamminkeln (DE); Frank Reiss, Lauchringen (DE)

(73) Assignee: MAN Diesel & Turbo SE, Augsburg (DE)

( * ) Notice: Subject to any disclaimer, the term of this patent is extended or adjusted under 35 U.S.C. 154(b) by 739 days.

(21) Appl. No.: 12/738,771

(22) PCT Filed: Nov. 3, 2008

(86) PCT No.: PCT/EP2008/009257
§ 371 (c)(1),
(2), (4) Date: Apr. 19, 2010

(87) PCT Pub. No.: WO2009/080142
PCT Pub. Date: Jul. 2, 2009

(65) Prior Publication Data
US 2010/0247005 A1  Sep. 30, 2010

(30) Foreign Application Priority Data
Dec. 24, 2007  (DE) .......................... 10 2007 062 681

(51) Int. Cl.
*F16J 15/08* (2006.01)
*F01D 9/02* (2006.01)
*F01D 11/00* (2006.01)

(52) U.S. Cl.
CPC ............. *F16J 15/0893* (2013.01); *F01D 9/023* (2013.01); *F01D 11/005* (2013.01); *F05D 2230/642* (2013.01); *F05D 2240/11* (2013.01)

(58) Field of Classification Search
USPC .................................. 277/608, 609, 643, 644
See application file for complete search history.

(56) References Cited

U.S. PATENT DOCUMENTS

| | | | | |
|---|---|---|---|---|
| 3,520,544 | A | * | 7/1970 | Taylor ............................ 277/644 |
| 4,477,057 | A | * | 10/1984 | Friess ............................ 251/306 |
| 4,537,024 | A | * | 8/1985 | Grosjean ......................... 60/791 |
| 4,603,892 | A | * | 8/1986 | Abbes et al. ................... 285/336 |
| 5,624,227 | A | * | 4/1997 | Farrell ............................ 415/139 |
| 5,639,100 | A | | 6/1997 | Garrigues et al. |
| 5,716,051 | A | * | 2/1998 | Cornea et al. ................... 277/609 |
| 6,419,237 | B1 | * | 7/2002 | More ............................ 277/602 |
| 6,431,825 | B1 | | 8/2002 | McLean |
| 7,334,800 | B2 | * | 2/2008 | Minnich ........................ 277/644 |
| 7,497,443 | B1 | * | 3/2009 | Steinetz et al. ................ 277/644 |
| 7,735,835 | B2 | * | 6/2010 | Kullen et al. .................. 277/598 |
| 7,740,248 | B2 | * | 6/2010 | Keene et al. ................... 277/603 |
| 7,744,096 | B2 | * | 6/2010 | Kono ............................. 277/644 |
| 8,052,155 | B2 | * | 11/2011 | Amos et al. .................... 277/644 |
| 8,123,232 | B2 | * | 2/2012 | Fujimoto et al. .............. 277/644 |
| 2002/0084596 | A1 | * | 7/2002 | Michele et al. ................ 277/609 |

(Continued)

FOREIGN PATENT DOCUMENTS

WO  WO2007/023734  3/2007

*Primary Examiner* — Vishal Patel
*Assistant Examiner* — L. Susmitha Koneru
(74) *Attorney, Agent, or Firm* — Cozen O'Connor

(57) ABSTRACT

A sealing segment for sealingly connecting two structural components parts which are movable relative to one another, with two sealing bodies which are connected to one another by a web and which can be arranged in recesses of the structural component parts in an articulated manner, and a sealing segment arrangement with a plurality of sealing segments of this type, and a flow machine with a sealing segment arrangement of this type.

22 Claims, 5 Drawing Sheets

(56) References Cited

U.S. PATENT DOCUMENTS

| | | |
|---|---|---|
| 2005/0076642 A1 | 4/2005 | Reichert |
| 2005/0179215 A1* | 8/2005 | Kono ............................ 277/628 |
| 2008/0142107 A1* | 6/2008 | Gudenburr et al. ........... 138/155 |
| 2009/0072497 A1* | 3/2009 | Kunitake et al. .............. 277/641 |
| 2009/0232690 A1* | 9/2009 | Maruo et al. .................. 418/191 |
| 2010/0117309 A1* | 5/2010 | Yudovsky ...................... 277/644 |
| 2011/0024995 A1* | 2/2011 | Schaefer et al. .............. 277/644 |

\* cited by examiner

US 9,182,039 B2

SEALING SEGMENT AND SEALING-SEGMENT ARRANGEMENT

PRIORITY CLAIM

This is a U.S. national stage of application No. PCT/EP2008/009257, filed on Nov. 3, 2008. Priority is claimed on the following application: Country: Germany, Application No.: 10 2007 062 681.0, Filed: Dec. 24, 2007, the content of which is/are incorporated here by reference.

FIELD OF THE INVENTION

The present invention is directed to a sealing segment according to claim 1 for sealingly connecting two structural components parts which are movable relative to one another, a sealing segment arrangement, and a flow machine with a sealing segment arrangement of this type.

BACKGROUND OF THE INVENTION

Sealing segments for sealingly connecting adjacent structural component parts are known per se. A sealing segment allowing a relative movement of adjacent structural component parts with respect to one another is disclosed, for example, in DE 2453645. This sealing segment comprises a plurality of metal rings and plastic rings in a sandwich-type construction and should be able to sustain rotational loading while retaining the sealing action. One of the disadvantages of this sealing segment is the costly sandwich construction. It is further disadvantageous that this sealing segment only allows a rotational relative movement between the two structural component parts. The maximum relative movement of the two structural component parts with respect to one another is limited by the shear strength of the sealing segment. Therefore, with every relative movement the sealing segment is subjected to material fatigue which has a lasting negative impact on the life of the sealing segment.

SUMMARY OF THE INVENTION

It is an object of the present invention to provide a sealing segment that permits different relative movements between adjacent structural component parts and which has a long life, a sealing segment arrangement, and a flow machine with a sealing segment arrangement of this kind.

A sealing segment according to the invention for sealingly connecting two adjacent structural component parts which are movable relative to one another has two sealing bodies which are connected to one another by a web. The sealing bodies can be arranged in recesses of the structural component parts and, together with the latter, form a sliding bearing. The sealing segment is accordingly disposed in an articulated manner between the two structural component parts so that a swiveling movement and an axial movement of the two structural component parts relative to one another can be compensated. In so doing, the sealing segment is not warped or deformed so that it has a long life compared to the known solution. At the same time, a tight connection with respect to pressure and temperature is produced over the entire relative movement. Further, an offset between the structural component parts can be compensated without tension by the articulated construction of the sealing segments according to the invention.

A preferred material for the sealing segment is a metal.

The sealing bodies are preferably cylindrical and are constructed so as to be radially springing to enhance the sealing effect. Accordingly, the sealing surfaces of the sealing bodies can contact opposing inner surfaces of the recesses so as to be preloaded.

In particular, the sealing bodies extend axially parallel to one another, which makes it possible in principle to use them in longitudinal and annular grooves arranged parallel to one another in the opposing structural component parts.

In one embodiment, the sealing segment is formed integral with its sealing bodies and the web from a tubular body.

In another embodiment, the sealing segment with its sealing bodies and the web is formed from an individual sheet-like sealing element. Free end portions of the sheet-like sealing element can be guided along the web or can be at a distance from it.

In another embodiment, the sealing segment comprises two sheet-like sealing elements which are connected to one another in the web area. For technical reasons relating to manufacture, it is advantageous when the two sealing elements are identically shaped. Free end portions of the sealing elements can be at a distance from one another in the assembled state. When using a plurality of sealing segments axially one behind the other, the sealing effect between adjacent sealing segments can be enhanced in that the sheet-like sealing elements are arranged so as to be offset relative to one another in longitudinal direction, so that there is a step-like material overlapping between the sealing segments.

In another embodiment, a transverse slit that can extend up to the web is formed in at least one sealing body to increase the elasticity of the sealing segment. The elasticity can be further increased in that a plurality of transverse slits are alternately provided in one sealing body so as to extend along the web into the other sealing bodies.

To improve the cooling of the sealing segments and sealing surfaces, the sealing bodies can be at least partially perforated. Alternatively, they can also be profiled. It is also conceivable to form the web so as to have a large surface area with at least one through-hole which can be connected to a cooling air supply.

A plurality of sealing segments form a sealing segment arrangement according to the invention. It is especially advantageous for stabilizing the sealing segments relative to one another and for stabilizing the sliding bearings when a connection element is inserted into adjacent sealing bodies in axial direction. For example, the connection element can be a coil, a flexible rod or a bar with spherical end portions.

The sealing action of the sealing segment arrangement according to the invention is optimized in such a way that, when used in the hot gas path of a flow machine, hot gas blow-by, for example, in the connection area between the combustion chamber side and the turbine side, is prevented. Further, overheating and excessive consumption of cooling air can be prevented by the cooling of the sealing segments. The sealing segments permit a reproducible fuel distribution and air distribution and prevent blow-by in the hot gas path, so that high efficiencies of the flow machine can be reliably achieved.

BRIEF DESCRIPTION OF THE DRAWINGS

Preferred embodiments of the invention will be described more fully in the following with reference to schematic drawings in which.

DETAILED DESCRIPTION OF THE PRESENTLY PREFERRED EMBODIMENTS

Figure 1:
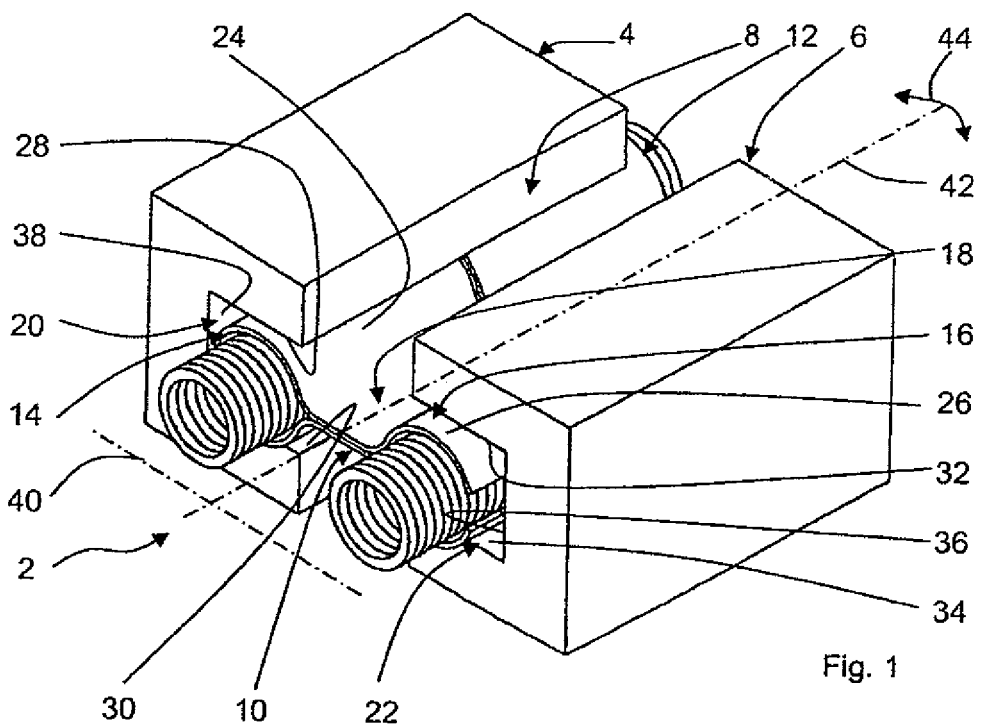
FIG. 1 is a three-dimensional view of a first sealing segment arrangement according to the present invention.

FIG. 1 shows a three-dimensional view of a sealing segment arrangement 2 according to the present invention for connecting two adjacent structural component parts 4, 6 so as to be sealed with respect to pressure and temperature. The structural component parts 4, 6 are shown in a highly simplified manner and are separated from one another by a gap 8. The sealing segment arrangement 2 comprises a plurality of metal sealing segments, two of which 10, 12 are shown by way of example.

Each sealing segment 10, 12 has two axially parallel, cylindrical sealing bodies 14, 16 which are connected to one another in each instance by a web 18 which is constructed so as to have an extensive surface. The sealing bodies 14, 16 are radially springing and are partially enclosed in a U-shaped, rectangular longitudinal groove 20, 22 of the structural component parts with inner groove surfaces 28, 30 and 32, 34, respectively, extending parallel to one another in pairs. The sealing bodies 14, 16 form sealing surfaces 24, 26 on the circumference by which they sealingly contact the inner groove surfaces 28, 30, 32, 34 of the structural component parts in some areas accompanied by preloading.

To compensate for different thermal expansions between the sealing segments 10, 12 and the structural component parts 4, 6, at least one sealing body 14, 16 is disposed at a distance from the groove base 36, 38; i.e., the distance between the groove bases 36, 38 of the opposite longitudinal grooves 20, 22 is greater than the extension of the sealing segments 10, 12 along their transverse axis 40.

According to the invention, the sealing bodies 14, 16 together with the structural component parts 4, 6 form a sliding bearing and are accordingly supported therein in an articulated manner. The longitudinal grooves 20, 22 serve as bearing shells which allow a relative movement of the structural component parts 4, 6 with respect to one another axially along a longitudinal axis 42 of the longitudinal grooves 20, 22 and a swiveling movement 44 around the longitudinal axis 42. The springing construction of the sealing bodies 14, 16 generates a preloading force which produces a tight connection between the sealing surfaces 24, 26 and the inner groove surfaces 28, 30 and 32, 34, respectively, with respect to pressure and temperature regardless of the respective relative movements between the structural component parts 4, 6 so that the gap 8 between the structural component parts 4, 6 is sealingly closed. At the same time, an offset between the longitudinal grooves 20, 22 can be compensated by the articulated bearing support of the sealing segments 10, 12 without tension being introduced into them.

Figure 2:
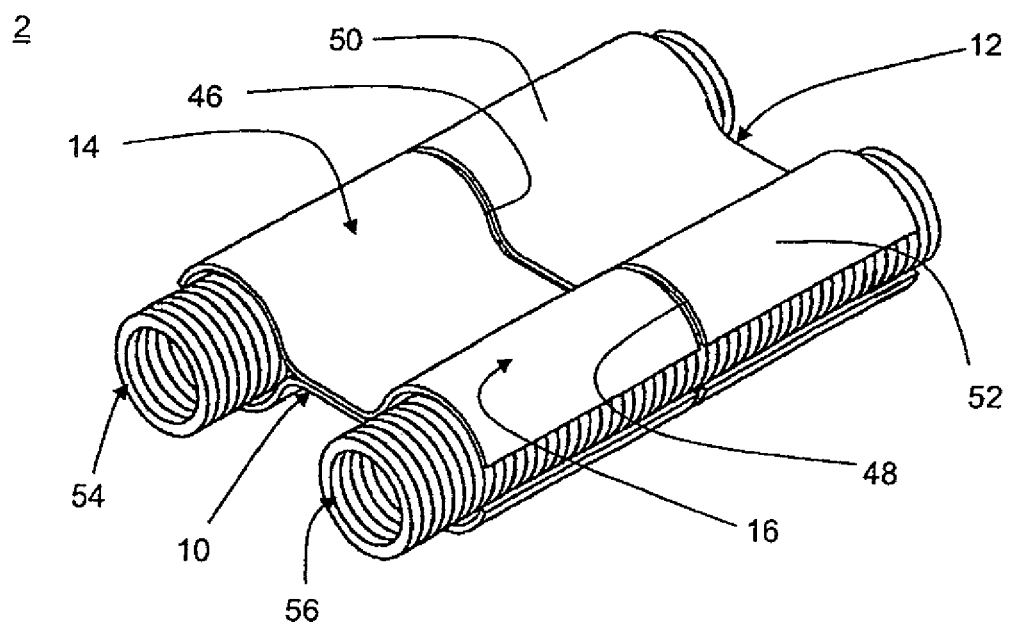
FIG. 2 is a detail view of the sealing segment arrangement of FIG. 1.

FIG. 2 shows a detail of the sealing segment arrangement 2 from FIG. 1. The sealing segments 10, 12 are constructed identically and symmetrically. They are arranged axially one behind the other and tightly contact one another by their opposing end faces 46, 48. The sealing bodies 14, 16, 50, 52 are hollow. A connection element 54, 56 is guided in each instance through its sealing bodies 14, 16 and 50, 52, respectively, which are arranged axially one behind the other. The connection elements 54, 56 are constructed here as coil springs and bring about a stabilizing of the sealing segments 10, 12 one behind the other and also a stabilizing of the sliding bearings or joints. The connection elements likewise facilitate an insertion of the sealing segment arrangement 2 into the longitudinal grooves 20, 22 shown in FIG. 1, which is preferably carried out by a swiveling movement. The sealing segments 10, 12 are discussed in detail in FIG. 3 with reference to sealing segment 10.

Figure 3:
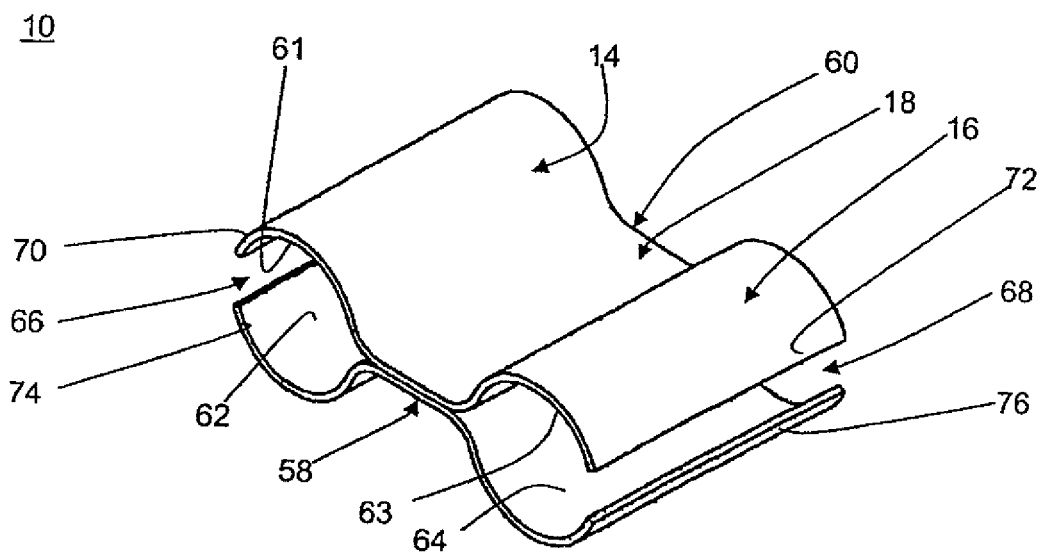
FIG. 3 is a detail view of a sealing segment of FIGS. 1 and 2.

As is shown in FIG. 3, the sealing segment 10 comprises two sheet-like sealing elements 58, 60 which are fixedly connected to one another in their center region to the web 18. The ends of the sealing elements 58, 60 are shell-shaped so that the cylindrical sealing bodies 14, 16 are formed by the opposing arrangement of their convex shell surfaces 61, 62, 63, 64. Accordingly, the sealing segments 10 are bone-shaped or dumbbell-shaped. The sealing bodies 14, 16 are constructed so as to be open along a longitudinal gap 66, 68 between opposite end portions 70, 74 and 72, 76, respectively, of the sealing elements 58, 60. The springing action of the sealing bodies 14, 16 and, therefore, the preloading force can be influenced in this way.

Figure 4:
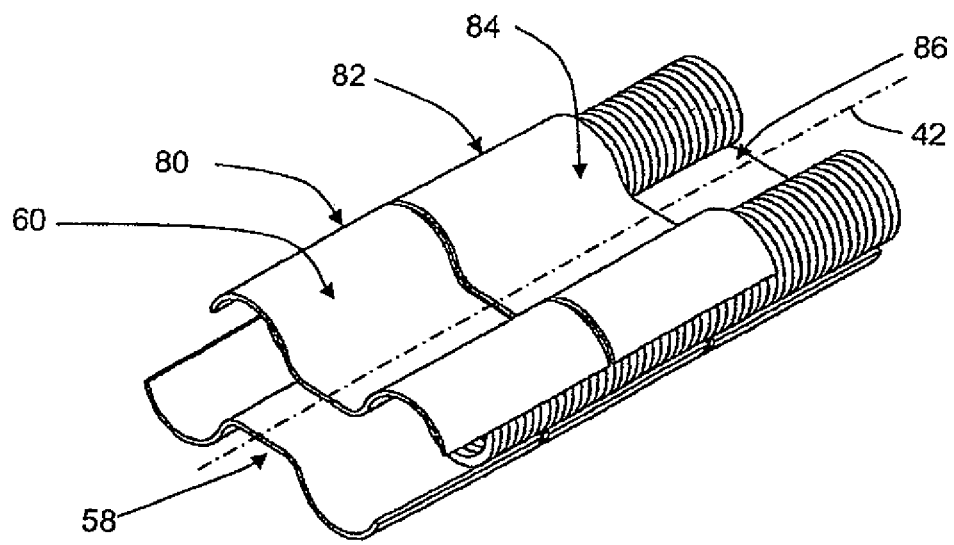
FIG. 4 shows a second sealing segment arrangement according to the present invention.

FIG. 4 shows another embodiment of a sealing segment arrangement 78 according to the invention. In contrast to the sealing segment arrangement 2 described above with reference to FIGS. 1 and 2, the sealing segment arrangement 78 has sealing segments 80, 82 whose two sheet-like sealing elements 58, 60 and 84, 86, respectively, are arranged so as to be offset relative to one another in direction of the longitudinal axis 42. Because of the axially offset arrangement of the sealing elements 58, 60 and 84, 86, respectively, the sealing area at the front end between the sealing segments 80, 82 is formed in a stepped manner and there is an overlapping of material of the two sealing segments 80, 82 which optimizes the sealing action between them.

Figure 5:
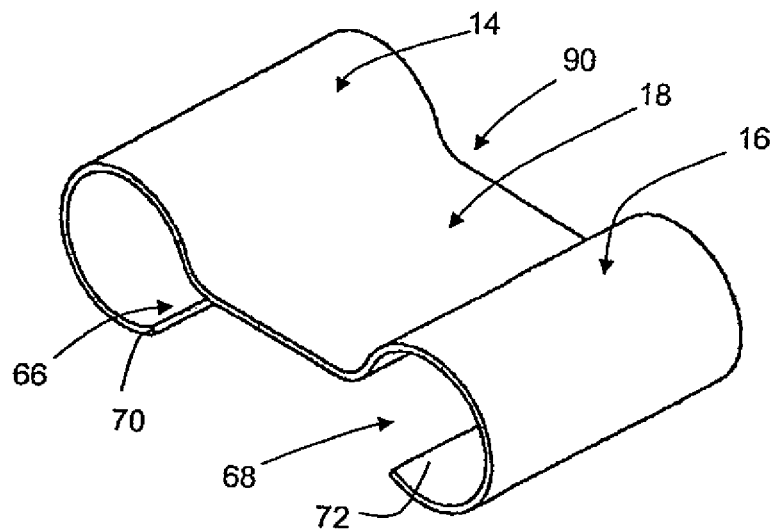
FIG. 5 shows a second embodiment of a sealing segment according to the present invention.

FIG. 5 shows an embodiment of a sealing segment 88 according to the invention which is produced in one piece from a sheet-like sealing element 90. The sealing element 90 is shaped in such a way that two axially parallel, cylindrical sealing bodies 14, 16 are formed at either end, a web 18 being formed therebetween. The sealing element 90 has two opposed free end portions 70, 72 which are at a distance from the web 18. Accordingly, the sealing bodies 14, 16 each have a longitudinal gap 66, 68 and are accordingly radially open.

Figure 6:
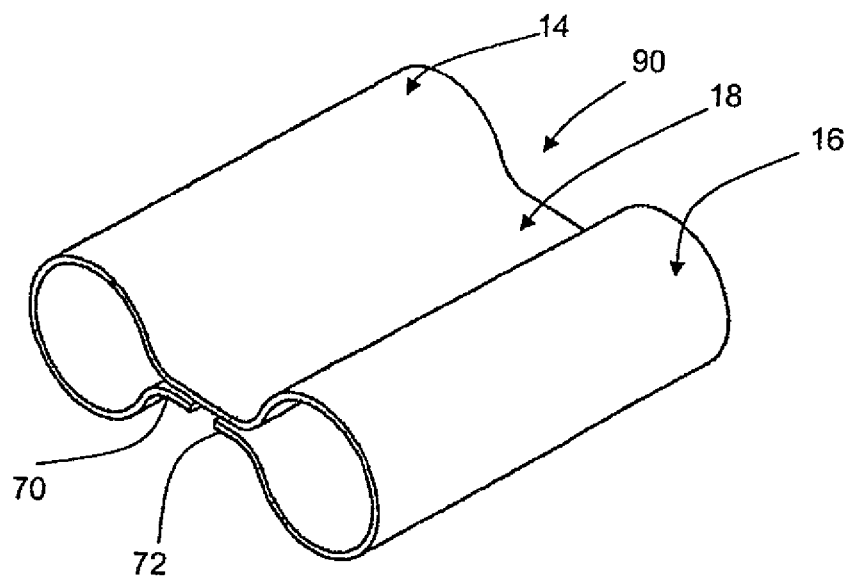
FIG. 6 shows a third embodiment of a sealing segment according to the present invention.

FIG. 6 shows an embodiment of a sealing segment 92 according to the invention which is formed from a sheet-like sealing element 90 like the sealing segment 88 described above with reference to FIG. 5. But in contrast to the sealing segment 88 according to FIG. 5, the end portions 70, 72 are guided to the web 18 and the sealing bodies 14, 16 are accordingly radially closed. The end portions 70, 72 can be fixedly connected to the web 18.

Figure 7:
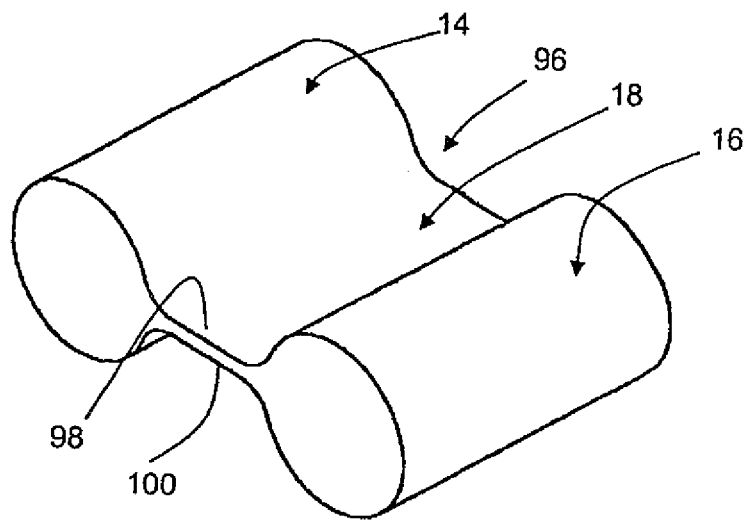
FIG. 7 shows a fourth embodiment of a sealing segment according to the present invention.

FIG. 7 shows an embodiment of a sealing segment 94 according to the invention which is formed from a tubular sealing element 96. The sealing element 96 is constructed so as to be closed along its circumference and is shaped in such a way that two axially parallel, cylindrical sealing bodies 14, 16 and a web 18 with an extensive surface are formed. A spring effect of the sealing bodies 14, 16 is achieved in that pipe wall portions 98, 100 of the sealing element 96 which form the web 18 are not connected to one another.

Figure 8:
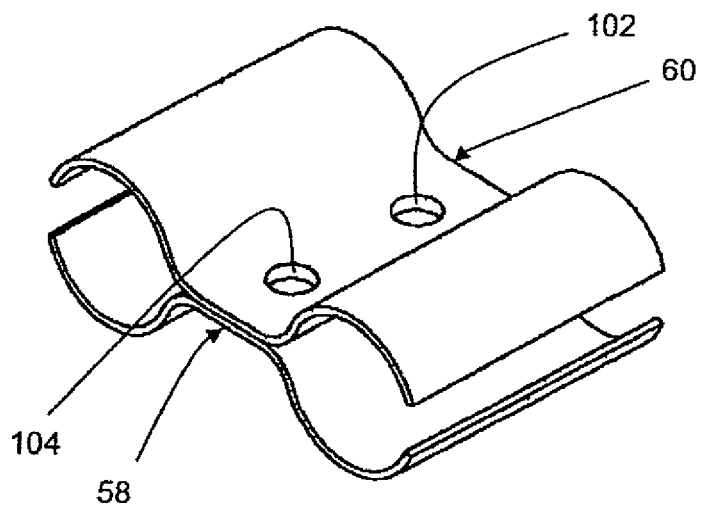
FIG. 8 shows a fifth embodiment of a sealing segment according to the present invention.

FIG. 8 shows a sealing segment 10 according to FIG. 3 comprising two sheet-like sealing elements 58, 60 which are joined in their center region to form the web 18. Two through-holes 102, 104 are arranged in the web 19 through which the cooling air, for example, can be conducted between the two structural component parts 4, 6 shown in FIG. 1.

Figure 9:
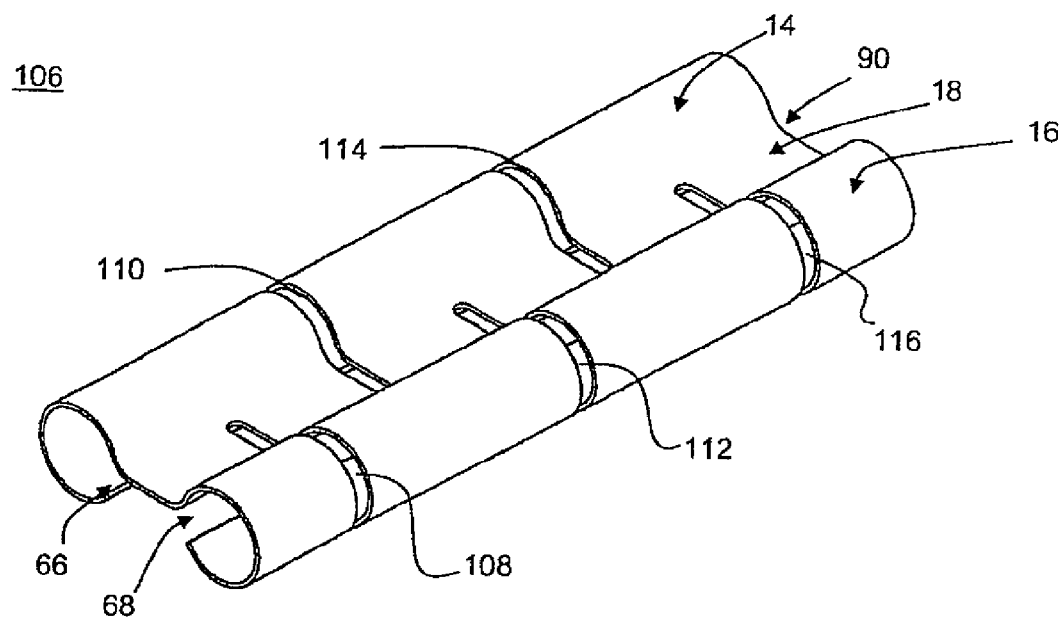
FIG. 9 shows a sixth embodiment of a sealing segment according to the present invention.

FIG. 9 shows an embodiment of a sealing segment 106 which is lengthened axially compared to the sealing segments described above according to FIGS. 1 to 8. The construction corresponds to the sealing segment 88 according to FIG. 5; i.e., it has a sheet-like sealing element 90 which is shell-shaped at either end to form axially parallel, cylindrical sealing bodies 14, 16. The sealing bodies 14, 16 are connected to one another by a web 18 having an extensive surface and are open in radial direction along a longitudinal gap 66, 68. Five transverse slits 108, 110, 112, 114, 116 extending alternately through the sealing bodies 14, 16 into the web 18 are provided for increasing a certain elasticity.

Figure 10:
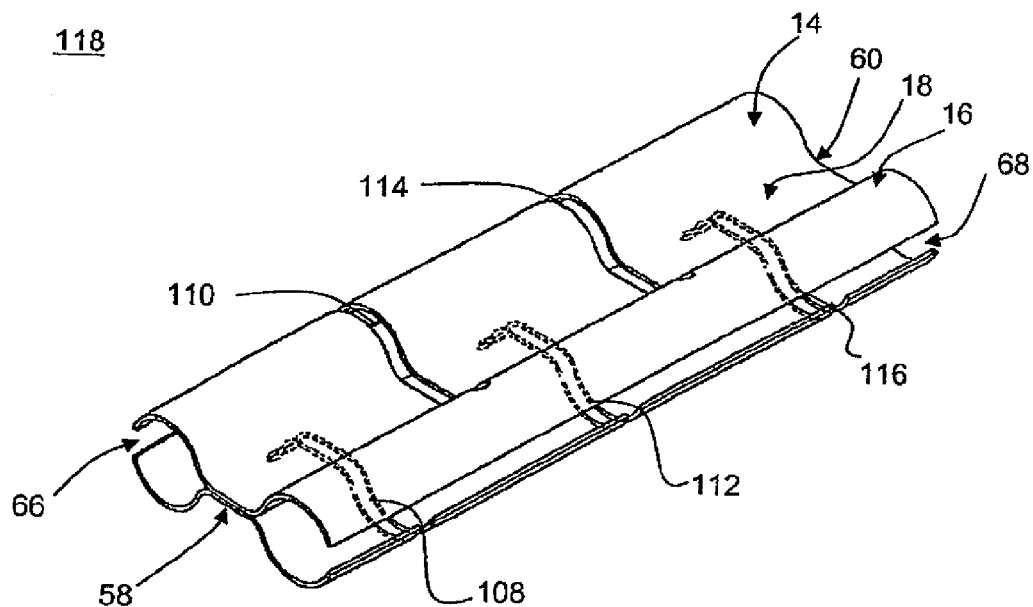
FIG. 10 shows a seventh embodiment of a sealing segment according to the present invention.

FIG. 10 shows an embodiment of a sealing segment 118 which is lengthened axially like the sealing segment 106 described above according to FIG. 9. The construction corresponds to the sealing segment 10 according to FIG. 3; i.e., it has two sheet-like sealing elements 58, 60 which are shell-shaped at their ends to form axially parallel, cylindrical sealing bodies 14, 16 with longitudinal gaps 66, 68 and are fixedly connected to one another in the central region to form the web 18. Five transverse slits 108, 110, 112, 114, 116 extending alternately from one sealing body 14 or 16 along the web 18 into the other sealing body 16 or 14 are formed for increasing a certain elasticity.

It should be noted that a cooling of the sealing segments mentioned above by way of example is not limited to at least one through-hole in the web 18, but rather other cooling variants are also conceivable. Among these, for example, is a perforation of the sealing surfaces 24, 26 of the sealing bodies 14, 16, which leads in particular to an improvement in the cooling of the inner groove surfaces 28, 30, 32, 34. A circumferential profiling of the sealing surfaces 24, 26 of the sealing bodies 14, 16 also causes a deliberate cooling of the inner groove surfaces 28, 30, 32, 34. Of course, the individual embodiment examples for cooling mentioned above can also be combined.

It is further noted that the use of the sealing segments and sealing segment arrangements 2, 78 mentioned above by way of example is not limited to axial, rectangular longitudinal grooves 20, 22. For example, it is also conceivable to form longitudinal grooves 20, 22 whose inner groove surfaces 28, 30 and 32, 34, respectively, are inclined relative to the groove base 36, 38 in such a way that the longitudinal grooves 20, 22 are widened proceeding from their groove opening in direction of their groove base 36, 38.

The use of the sealing segments or sealing segment arrangements 2, 78 according to the invention is also not limited to longitudinal grooves, per se; rather, they can also be used in annular grooves so that annular gaps between adjacent structural component parts 4, 6 can be tightly closed. In this regard, it is advantageous when the individual sealing segments have an arc shape in longitudinal direction corresponding to the respective annular groove and/or a corresponding plurality of transverse slits. An example of the use of the sealing segment arrangements according to the invention in front annular grooves is their use in flow machines, particularly in the hot gas path between combustion chamber components and turbine components such as the initial blading. The corresponding combustion chamber component has an annular groove at its end face directed toward the guide vane stage for receiving the sealing body 14 of the sealing segment arrangements according to the invention. The guide vane stage likewise has in its end face directed toward the combustion chamber component an annular groove for receiving the sealing body 16. When relative movements occur between the combustion chamber side and the turbine side owing, for example, to thermal stresses, these relative movements are compensated by the articulated construction of the sealing segments according to the invention while retaining the required tightness relative to pressure and temperature and without introducing loads, for example, tensile forces or shearing forces, into the sealing segments.

It is also noted that the elastic connection elements are not limited to coils; rather, elastic rods or bars with spherical end heads are also conceivable, for example.

It is further noted that the sealing segments can also be produced from a material other than metal. The material is primarily determined by the anticipated environmental conditions and may also be a plastic, for example. Further, it is conceivable to provide the sealing bodies 14, 16 in particular with a corrosion-resistant, low-friction coating, for example.

Disclosed herein is a sealing segment for sealingly connecting two adjacent structural component parts which are movable relative to one another, the sealing segment has two sealing bodies which are connected to one another by a web and are arranged in recesses of the structural component parts in an articulated manner, and a sealing segment arrangement with a plurality of sealing segments of this kind, and a flow machine with a sealing segment arrangement of this kind.

The invention is not limited by the embodiments described above which are presented as examples only but can be modified in various ways within the scope of protection defined by the appended patent claims.

The invention claimed is:

1. A sealing assembly comprising a first and second adjacent structural component part (4, 6) of a flow machine which in an installed position are movable relative to one another about an axis; a plurality of sealing segments (10, 12), each sealing segment comprising a central web (18) and first and second sealing bodies (14, 16) having a circular cross-section connected to one another by said central web (18), said central web (18) comprising a unitary surface that defines a substantially flat plane extending in the axial direction and between said opposed circular first and second sealing bodies (14, 16), said central web having a thickness and a length in the axial direction, said axial length being larger than said thickness; said structural component parts of a flow machine each having a U-shaped, rectangular longitudinal recess (20, 22) therein; said first circular sealing body (14) being in contact only with said U-shaped recess of said first structural part (4) and said second circular sealing body (16) being in contact only with said U-shaped recess of said second structural part (6) so that each of said first and second sealing body (14, 16) is contactingly arranged in an articulated manner only in a respective one of said U-shaped recesses (20, 22) of said first and second structural component parts (4, 6); a circular connection element (54, 56) extending through each of said first and second circular sealing bodies thereby connecting said plurality of sealing segments and wherein said sealing bodies (14, 16) and said recesses (20, 22) are constructed to form a sliding bearing.

2. The sealing assembly according to claim 1, wherein said sealing bodies (14, 16) are constructed so as to be radially springing.

3. The sealing assembly according to claim 1, wherein said sealing bodies (14, 16) extend axially parallel to one another.

4. The sealing assembly according to claim 1, wherein said sealing bodies (14, 16) and said web (18) are formed from a tubular sealing element (96).

5. The sealing assembly according to claim 1, wherein said sealing bodies (14, 16) and said web (18) are formed from a sheet-shaped sealing element (92) having free end portions (70, 72); said free end portions (70, 72) being guided along said web (18).

6. The sealing assembly according to claim 1, wherein said sealing bodies (14, 16) and said web (18) are formed from a sheet-shaped sealing element (92) having free end portions (70, 72); said free end portions (70, 72) being at a distance from said web (18).

7. The sealing assembly according to claim 1, wherein said sealing bodies (14, 16) and said web (18) are formed from two sheet-like sealing elements (58, 60) fixedly connected to one another in their respective center region to form said web (18).

8. The sealing assembly according to claim 7, additionally comprising two opposed free end portions (70, 72); and wherein said sealing elements (58, 60) are identically shaped and said opposing free end portions (70, 72, 74, 76) being at a distance from one another.

9. The sealing assembly according to claim 7, wherein said sealing elements (58, 60) are arranged so as to be offset relative to one another in longitudinal direction.

10. The sealing assembly according to claim 1, additionally comprising a transverse slit (108, 110, 112, 114, 116) extending into said web (18) formed in at least one of said sealing bodies (14, 16).

11. The sealing assembly according to claim 9, wherein said at least one transverse slit (108, 110, 112, 114, 116) extends from one said sealing body (14) through said web (16) into said other sealing body (16).

12. The sealing assembly according to claim 9, wherein a plurality of transverse slits (108, 110, 112, 114, 116) are alternately arranged in said sealing bodies (14, 16).

13. The sealing assembly according to claim 1, wherein said sealing bodies (14, 16) comprise an at least partially perforated sealing surface (24, 26).

14. The sealing assembly according to claim 1, wherein said sealing bodies (14, 16) comprise a profiled sealing surface (24, 26).

15. The sealing assembly according to claim 1, wherein said web (18) is formed so as to comprise a large surface area having at least one through-hole (102, 104).

16. The sealing assembly according to claim 1, wherein said sealing elements (58; 60; 84; 86; 90; 96) are made of a metal material.

17. A sealing assembly arrangement comprising first and second structural component parts of a flow machine each having a U-shaped, rectangular longitudinal recess therein; at least two connection elements (54, 56); and a plurality of sealing segments (10, 12; 80; 82; 88; 92; 94; 106) each sealing segment comprising a central web (18) and first and second sealing bodies (14, 16) connected to one another by said central web, said central web (18) comprising a unitary surface that defines a substantially flat plane extending in the axial direction and between said opposed circular first and second sealing bodies (14, 16), said central web having a thickness and a length in the axial direction, said axial length being larger than said thickness; each first sealing body of said sealing segment in contact only with said U-shaped rectangular recess of said first structural component part and each second sealing body in contact only with said U-shaped rectangular recess of said second structural component part; said plurality of sealing segments being arranged axially adjacent to one another and supported in an articulated manner in said U-shaped recesses (20, 22) by said two structural component parts (4, 6); said structural component parts being movable relative to one another and connected to one another by said at least two circular connection elements (54, 56).

18. The sealing assembly arrangement according to claim 17, wherein said connection elements (54, 56) comprise coils which are guided axially through said sealing bodies (14, 16).

19. The sealing assembly arrangement according to claim 17, wherein said connection elements (54, 56) are flexible rods which are guided axially through said sealing bodies (14, 16).

20. The sealing assembly arrangement according to claim 17, wherein said connection elements (54, 56) are bars with spherical end heads guided axially through said sealing bodies (14, 16).

21. A flow machine with a sealing assembly arrangement comprising two structural component parts each having a U-shaped, rectangular, longitudinal recess therein; at least two connection elements (54, 56); and a plurality of sealing segments (10, 12; 80; 82; 88; 92; 94; 106) arranged axially adjacent to one another and supported in an articulated manner in said recesses (20, 22) by said two structural component parts (4, 6), each sealing segment comprising a central web (18) and first and second sealing bodies (14, 16) having a circular cross-section connected to one another by said central web (18), said central web (18) comprising a unitary surface that defines a substantially flat plane extending in the axial direction and between said opposed circular first and second sealing bodies (14, 16), said central web having a thickness and a length in the axial direction said axial length being larger than said thickness; said structural component parts being movable relative to one another and connected to one another by said at least two connection elements (54, 56).

22. The sealing assembly according to claim 1, wherein said sealing bodies are arranged in an articulated manner in said recesses so as to compensate for one of a swiveling movement and an axial movement between said structural component parts.

\* \* \* \* \*